March 9, 1943.  E. E. FORSTROM  2,313,426
STRAIN DEVICE
Filed Oct. 13, 1939
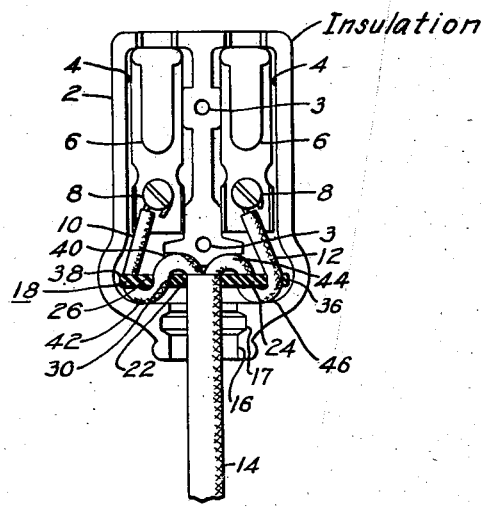
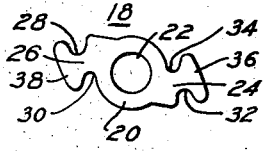
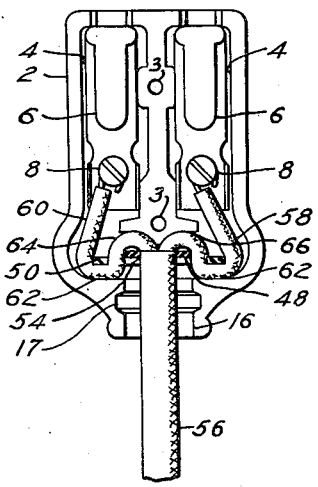
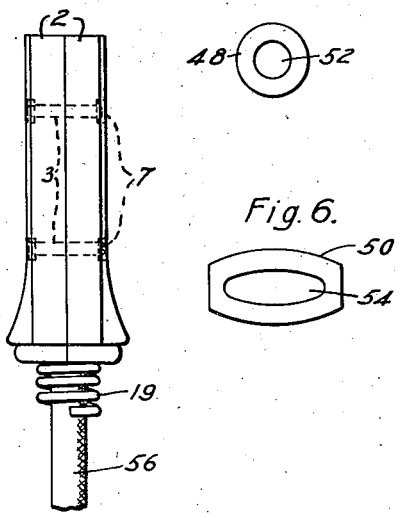
WITNESSES:
N. F. Susser
Arthur T. Stratton
INVENTOR
Edward E. Forstrom.
BY Ralph H. Swingle
ATTORNEY Patented Mar. 9, 1943

2,313,426

UNITED STATES PATENT OFFICE 2,313,426

STRAIN DEVICE

Edward E. Forstrom, Stratford, Conn., assignor to The Bryant Electric Company, Bridgeport, Conn., a corporation of Connecticut Application October 13, 1939, Serial No. 299,311

2 Claims. (Cl. 173—322)

My invention relates in general to the connection of electric cords to electric appliances, and more particularly to novel means for relieving the strain on such connections occasioned by the application of force tending to separate the cord and appliance.

Electric appliances are usually provided with cord sets for connection with a source of electrical energy which may comprise an elongated flexible insulated conducting means having at each end thereof a connector plug of the male or female type. The actual connection of the conductor and plug is usually a simple screw or soldered connection, and considerable difficulty and danger has been encountered due to the separation of this connection when a pull is exerted on the cord to detach its plug from the appliance or outlet box with which it is associated.

Accordingly, it is an object of my invention to provide novel means for relieving the strain on the connection between appliance cords and plugs.

Many solutions to this problem have been proposed in the past which, however, have usually been relatively complex and expensive, or involve some relatively extensive modification of the particular plug structure, or have required the use of an excessive amount of cord for this purpose.

Another object of my invention is to provide a novel strain relief device for a cord and plug connection, which is of relatively simple form and utilizes a minimum of cord length for strain relief purposes.

Another object of my invention is to provide a novel simplified form of strain relief device for electrical appliance cords and plugs, which is separate from the plug and readily assembled therewith.

A further object of my invention is to provide an appliance cord strain relief device which is applicable to many known types of devices for connecting cords to electric appliances.

These and other objects of my invention will become more apparent upon consideration of the following detailed description of preferred embodiments thereof, taken in connection with the attached drawing, in which:

Figure 1 is a plan view of a plug embodying one form of strain means constructed in accordance with my invention, with one-half of the plug body removed;

Fig. 2 is a plan view of the strain relief device shown in section in Fig. 1;

Fig. 3 is a view similar to Fig. 1 but showing a modified form of strain relief means in cross section;

Fig. 4 is a side view of a complete plug;

Fig. 5 is a plan view of a part of the strain relief means employed in the plug of Fig. 3; and Fig. 6 is a plan view of the other part of the strain relief means shown in the plug of Fig. 3.

In general, my novel strain relief means comprises a member of insulating material which is freely inserted within a plug but prevented from withdrawal therefrom, and includes an aperture through which the cord entering the plug passes, after which the separate conductors of the cord are separated and bent reversely to loop around oppositely extending portions of the strain relief device, before their attachment to connecting means within the plug. This general form of strain relief device enables the clamping of an intermediate portion of the cord conductors, at least between the strain relief device and a portion of the plug body when a pull is exerted on the cord. In one form of my invention, an additional clamping action is provided on a separate intermediate portion of the cord conductors, by the joint action of the two separate parts which comprise the strain relief device.

In the embodiment of my invention shown in Figs. 1 and 2, I have shown a female type electric appliance plug which includes two identical plug halves 2 made of any suitable insulating material, preferably a molded insulating material such as Bakelite or the like. The two plug halves 2 are secured together by any desired means, such as the bolts and nuts 7 (shown in Fig. 4) passing through the spaced apertures 3 located along the center line of the plug 1. Inasmuch as the plug halves are identical, only one will be described in detail. Each plug half is provided with recesses 4 and receives the female connector clips 6 having terminal screws 8 at the inner ends thereof for securing thereto the free ends of the conductors 10 and 12 of the appliance cord 14. As is apparent from Fig. 1, each plug half 2 is also provided with a semi-cylindrical depression 16 for receiving the cord 14. The depression 16 communicates with the inner ends of the recesses 4. Intermediate the ends of the recess 16 there is provided a depressed semi-circular portion 17 which is adapted to receive and anchor the enlarged end of a coil spring 19 or the like surrounding the cord 14 adjacent the plug to prevent undue flexing of the cord at this point.

The strain relief device 18 employed in this embodiment of my invention may be made of any suitable insulating material, such as fiber, and is shown more particularly in Fig. 2 to include a central substantially circular disc-like portion 20 having a central substantially circular aperture 22, and oppositely extending arms 24 and 26. The arm 24 is provided intermediate its ends with opposite notches or indentations 32 and 34, and an enlarged end portion 36. The arm 26 is likewise provided intermediate its ends with opposed notches or indentations 28 and 30 and an enlarged end portion 38. As is clearly apparent from Fig. 2, the inner ends of the indentations 30 and 34 are in line with the center of the aperture 32. Also, the indentations 30 and 34 lie closer to the aperture 22 than do the indentations 28 and 32 for a purpose which will be hereinafter referred to.

Referring now back to Fig. 1, it is believed apparent that in the assembly of the device, or in the assembly of the cord to the plug, the cord 14 is first let in through the depression 16 and through the aperture 22 in the strain relief device 18. The insulation on the cord 14 is cut away at this point and the conductors 10 and 12 of the cord 14 are separated, and the conductor 10 is reversely bent as at 40 to extend reversely through the indentation 30, which lies closely adjacent the aperture 22, and then around the arm 26 of the strain relief device through indentation 28, to be connected to its connector clip 6 by the screw 8. Similarly, the conductor 12 is reversely bent as at 44 to extend through the adjacent indentation 34 and around the arm 24 of the strain relief device, through the indentation 32, to be connected to its connector clip 6.

It should now be apparent that upon the application of a force tending to separate the cord 14 and plug body, which usually occurs by virtue of a pull exerted on the cord, that the intermediate looped portions 42 and 46 of the cord conductors 10 and 12, respectively, will be clamped between the strain relief device 18 and the portion of the plug body adjacent the depression 16, thereby substantially relieving the connections of the conductors 10 and 12 to the connector clip 6, of substantially all tensile stress. It should also be noted that by virtue of this particular strain relief device that the conductors of the cord 14 are not separated until they are a substantial distance within the plug, and upon separation, they are effectively insulated from each other.

With respect to a force causing relative twisting of cord 14 and the plug, it will be noted (Fig. 2) that a line tangent to disc-like portion 20 at either side thereof and drawn across an indentation touching the outermost portion of the side of strain relief device spaced from the disc-like portion in a direction toward the indentation, will close the mouth of the indentation at least sufficiently to prevent the escape of a conductor 10 or 12 therefrom. Since it is apparent from the drawing that strain relief device 18 is substantially the same size as the cavity in the plug, upon twisting of cord 14 relative to the plug, strain relief device 18 will be rotated relative to the plug until oppoiste wall portions of the plug cavity engage diagonally opposite sides of arms 24 and 26 and thereby close off diagonally opposite indentations as indicated above for the tangent lines, because the opposite side walls of the plug cavity will then occupy positions corresponding to the aforesaid tangent lines. This will positively prevent the escape of both conductors from their respective indentations.

It should also be noted that because one pair of diagonally opposite indentations 30, 34 of strain relief device 18 are closer to aperture 22 than the other pair of diagonally opposite indentations 28, 32, conductors 10 and 12 are bent about arms 24, 26, respectively, in opposite directions.

In Figs. 3, 5 and 6, I have shown another embodiment of a strain relief device in connection with the same type of plug described with the previous embodiment. Therefore, like reference characters will be used to designate like parts of the plug. As shown in Figs. 5 and 6, this strain relief device comprises two washer-like elements 48 and 50. As seen in Fig. 5, the washer element 48 is substantially circular in form and is provided with a substantially circular central aperture 52. The washer element 50 is of elongated form, and is provided with an elongated aperture 54. The largest transverse dimension of the washer element 50 is substantially the same as the diameter of the washer element 48. However, the longitudinal dimension of the washer element 50 is substantially greater than the outer diameter of the washer element 48 and, as shown in Fig. 3, is such that the aperature 54 in washer element 50 extends a distance beyond the washer element 48 which is slightly less than the thickness of the cord conductor.

As seen in Fig. 3, the cord 56 extends into the plug in the same manner as the cord 14 described in connection with Fig. 1, and extends through the apertures 52 and 54 in both of the washer members 48 and 50, respectively, the washer element 48 being positioned inwardly of the washer element 50. The conductors 58 and 60 of the cord 56 are separated after passing through the apertures in the washer elements and are reversely bent, as at 64 and 66, to extend around the washer element 48 and back through the ends of the aperture in the washer element 50. The conductors are then looped around the ends of the washer element 50 as at 62 for connection with their respective conductor clips 6.

It should be apparent from the foregoing that a pull on the cord 56 will first move the washer 48 downwardly, as viewed in Fig. 3, thus tending to clamp intermediate portions of each conductor 58 and 60 between the outer sides of the washer element 48 and the outer ends of the aperture 54 in the washer element 50. Also, similarly to the previously described embodiment, the portions of conductors 58 and 60 lying between the washer element 50 and the lower end of the plug body, adjacent the depression 16, will be clamped between these two parts, thus giving two spaced clamped portions of each conductor 58 and 60, located between the cord 56 and the point of attachment of the conductors 58 and 60 to their respective connector clips. By this construction any strain exerted on the cord 56 is positively prevented from reaching the connection between the conductors 58 and 60 and their respective conductor clips.

It should therefore be apparent that I have provided novel forms of strain relief devices for appliance cords which are separate from the cord and plug body to which the cord is attached, yet are effective to clamp intermediate portions of the conductor to the plug to relieve the actual connections of the cord conductors to the plug connector clips, of any strain exerted upon the cord independently of the plug. It should also be apparent that in both forms of my novel strain relief device, relatively simple constructions have been achieved which nevertheless operate efficiently to relieve the strain on the connection of the cord conductors to the plug connector clips.

Having described preferred embodiments of my invention in detail in accordance with the patent statutes, I wish it to be understood that I do not desire my invention to be limited to the exact constructions disclosed herein, inasmuch as it will be obvious, particularly to persons skilled in the art, that many changes and modifications may be made in the specific embodiments disclosed, without departing from the broad spirit and scope of my invention. Therefore, I desire that my invention be limited only by what is expressly set forth in the following claims.

I claim as my invention:

1. In a plug which is recessed to accommodate cord connecting means therein, an aperture in one end of said plug leading to said recess, a cord extending through said aperture for connection to said connecting means, strain relief means in said recess intermediate said aperture and connecting means, and being freely received in said recess adjacent said aperture, said means embodying a relatively thin elongated member having a substantially central aperture and oppositely extending arms having intermediate opposed indentations, one pair of diagonally opposite indentations being deeper and closer to said aperture than the other pair, and said cord extending from said plug aperture through said strain member aperture, and the separated conductors thereof being looped over said arms at said indentations in opposite directions and connected to said connecting means.

2. Means for relieving the strain on appliance cord connections, including a flat thin insulating apertured member having oppositely extending arms and each arm having opposed indentations with one pair of diagonally opposite indentations being deeper and closer to said aperture than the other pair.

EDWARD E. FORSTROM.